United States Patent [19]

Anderson et al.

[11] Patent Number: 5,123,257

[45] Date of Patent: Jun. 23, 1992

[54] TRANSPORT REFRIGERATION SYSTEM

[75] Inventors: Lowell M. Anderson, Bloomington; Rodney H. Volk, Eden Prairie; Herman H. Viegas, Bloomington, all of Minn.

[73] Assignee: Thermo King Corporation, Minneapolis, Minn.

[21] Appl. No.: 687,796

[22] Filed: Apr. 19, 1991

[51] Int. Cl.⁵ .............................................. F25B 27/00
[52] U.S. Cl. ...................................... 62/236; 62/239; 62/323.1
[58] Field of Search .................. 62/239, 295, 323.1, 62/323.3, 323.4, 429, 236; 267/292, 153; 248/635, 638

[56] References Cited

U.S. PATENT DOCUMENTS

| | | | |
|---|---|---|---|
| 3,646,773 | 3/1972 | Falk et al. | 62/236 X |
| 4,551,986 | 11/1985 | Anderson et al. | 62/239 |
| 4,736,597 | 4/1988 | Anderson et al. | 62/239 |
| 4,811,569 | 3/1989 | Welch et al. | 62/239 |
| 4,922,727 | 5/1990 | Viegas | 62/239 |
| 4,930,758 | 6/1990 | Poirier | 267/292 |
| 5,046,326 | 9/1991 | Havemann et al. | 62/239 X |

Primary Examiner—William E. Tapolcai
Attorney, Agent, or Firm—D. R. Lackey

[57] ABSTRACT

A transport refrigeration system having a frame which supports a refrigerant compressor, a prime mover for the compressor, condenser and evaporator coils, and an air delivery assembly for moving air through the condenser and evaporator coils. The air delivery assembly includes a single shaft having first and second condenser blowers mounted adjacent the ends of the shaft, and an evaporator blower mounted on the shaft between the first and second condenser blowers. A drive arrangement for the air delivery assembly includes a jack shaft between the shaft of the air delivery assembly and the prime mover, with the prime mover being linked to drive the jack shaft, and with the jack shaft being linked to drive the shaft of the air delivery assembly.

5 Claims, 3 Drawing Sheets

TRANSPORT REFRIGERATION SYSTEM

TECHNICAL FIELD

The invention relates to transport refrigeration systems, and more specifically to a transport refrigeration system suitable for mounting on the nose of a highway trailer.

BACKGROUND ART

U.S. Pat. No. 4,551,986, which is assigned to the same assignee as the present application, discloses a transport refrigeration system for mounting on the nose of a trailer, between a trailer and the associated tractor or cab. The refrigeration system disclosed in the aforesaid patent has a depth dimension measured in a horizontal longitudinal direction between a tractor and associated trailer of about 30 to 32 inches (762-812 mm.). This locates the housing or unit cover within a 62 inch (1575 mm.) swing radius on a 36 inch (914 mm.) trailer king pin location, which is suitable for the North American market, providing approximately 12.75 square feet (1.184 square meters) of top view area for the refrigeration system.

New regulations in the European Economic Community (EEC) require transport refrigeration systems which are nose mounted on a highway trailer to be within a 2040 mm. swing radius, from a kingpin location of 12 meters from the rear of the trailer. These requirements dictate a depth dimension for a transport refrigeration unit of 21 inches (533 mm.), or less. This provides only 7.86 square feet top view area (0.73 square meter) of space for the transport refrigeration unit, a 39% reduction from the North American design configuration. This shallow depth dimension must be achieved with a "zero cube" evaporator, ie., without penetration of the evaporator into the payload area of the trailer.

It would be desirable, and it is an object of the present invention, to provide a transport refrigeration unit having a component layout and configuration which enables the unit to meet the EEC space requirement, without a corresponding loss in performance, i.e., refrigeration capacity.

SUMMARY OF THE INVENTION

Briefly, the present invention is a transport refrigeration system adapted for mounting on the front wall of a trailer, including a frame which supports a refrigerant compressor, a condenser coil assembly, an evaporator coil assembly, an air delivery assembly, and a prime mover assembly, which includes an internal combustion engine, for driving the compressor. The air delivery assembly includes first, second and third blowers mounted on a first shaft. The first and third blowers are condenser blowers arranged to provide air flow through the condenser coil assembly. The second blower is an evaporator blower arranged to provide air flow through the evaporator coil, and it is disposed intermediate the first and third blowers.

An air delivery drive arrangement includes a jack shaft disposed in spaced parallel relation with the first shaft. A first pulley and belt arrangement operatively links the jack shaft with the first shaft, and means, including a second pulley and belt arrangement, links the prime mover arrangement with the jack shaft. The air delivery assembly, and an air delivery drive arrangement, enable the shallow EEC depth requirement to be met.

Maximum unit operating noise is also specified by the EEC. The air delivery arrangement and the air delivery drive arrangement reduce air noise transmitted outside the unit housing. In a preferred embodiment of the invention, a three-point triangular base mounting configuration for the internal combustion engine is provided which reduces engine vibration transmitted to the unit frame. We found that such a mounting arrangement transmitted less engine noise and thus less noise to the unit frame than a four point rectangular mounting configuration. Front and rear snubbers are also provided adjacent the longitudinal ends of the engine to protect the three engine mounts from damage, as well as to prevent the internal combustion engine from contacting the relatively close housing, when the unit is subjected to jolts and bumps from the moving trailer.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF PREFERRED EMBODIMENTS

Figure 1:
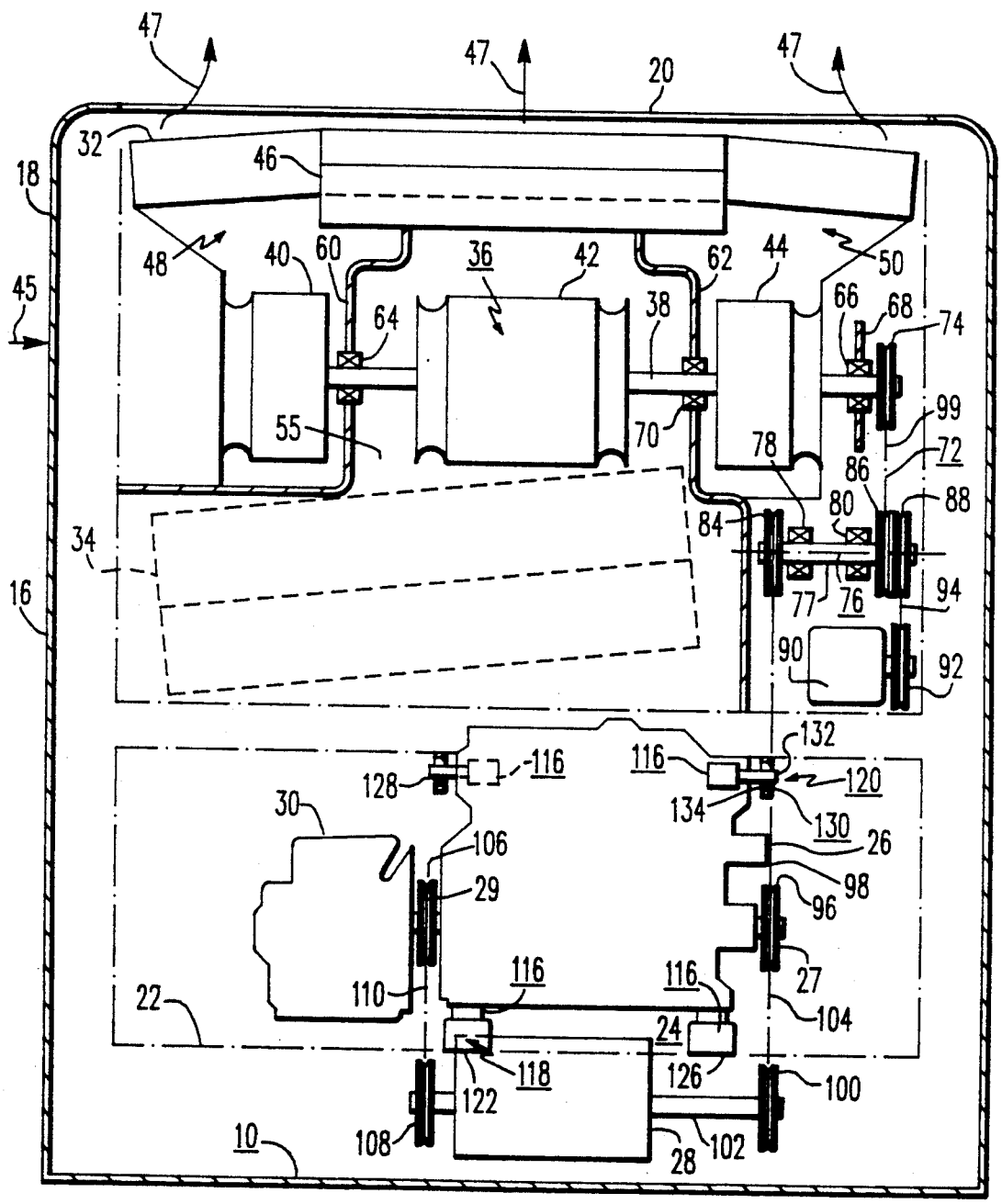
FIG. 1 is a front elevational view, with the housing being shown in section, of a transport refrigeration system constructed according to the teachings of the invention.
Figure 2:
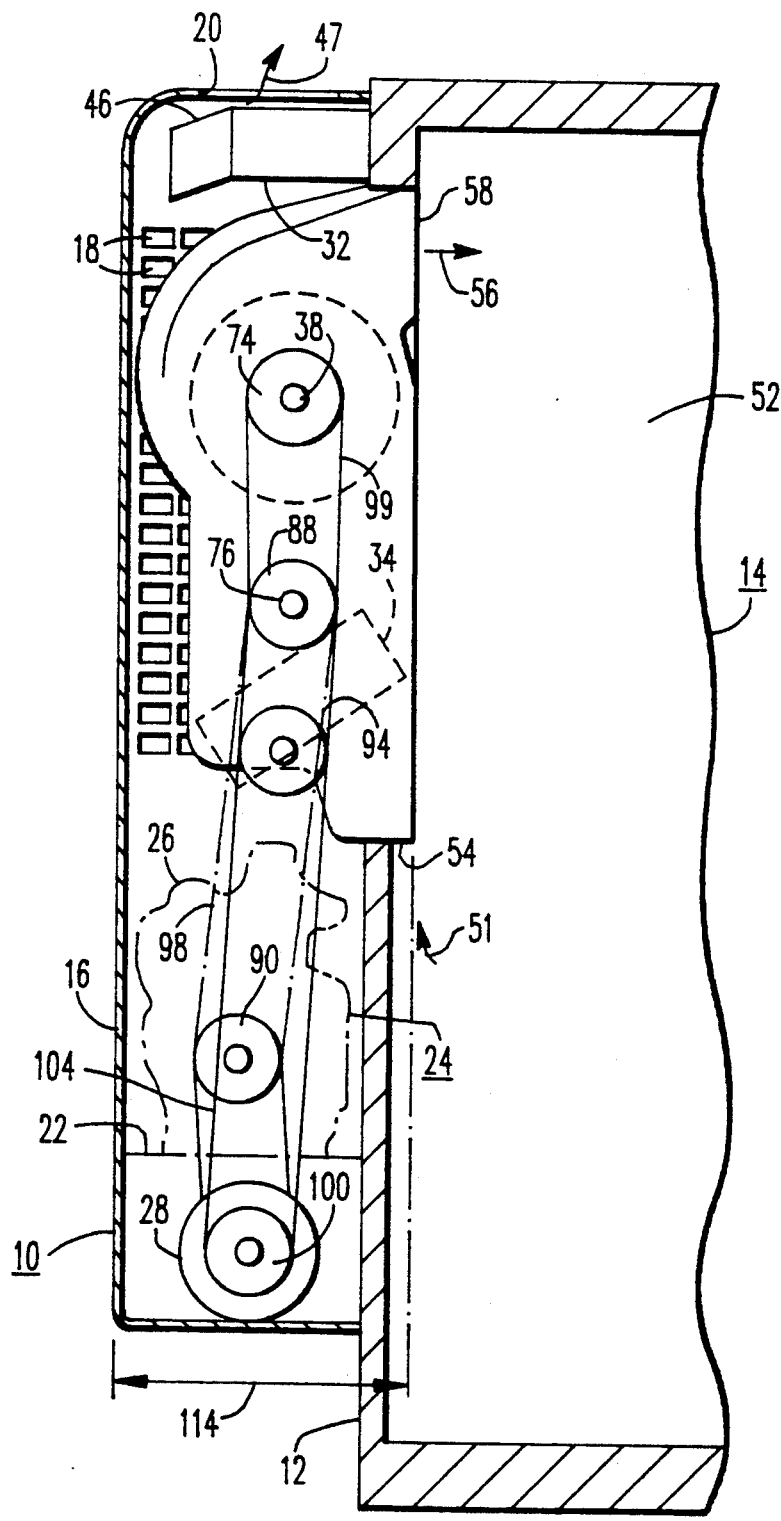
FIG. 2 is an side elevational view, with the housing in section, of the transport refrigeration system shown in FIG. 1.
Figure 3:
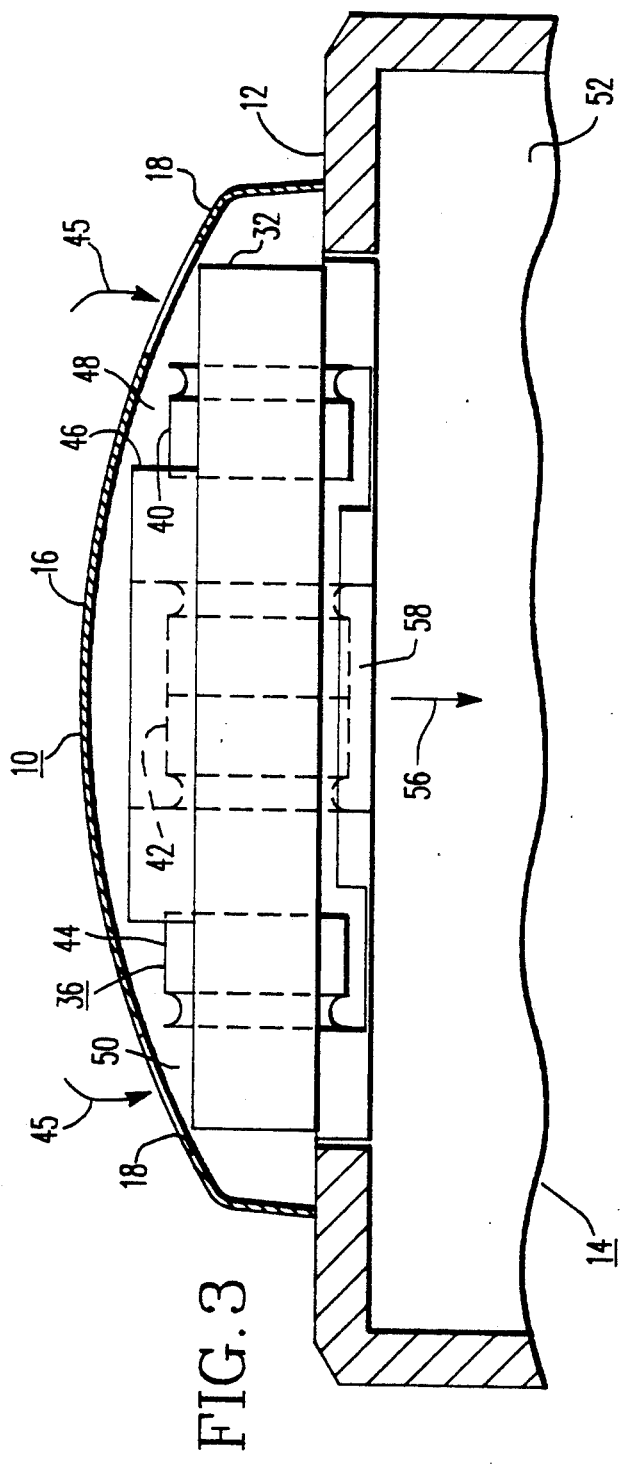
FIG. 3 is a plan view, with the housing in section, of the transport refrigeration system shown in FIGS. 1 and 2.

Referring now to the drawings, and to FIGS. 1, 2 and 3 in particular, there are shown front and side elevational views, and a plan view, respectively, of a transport refrigeration system or unit 10 constructed according to the teachings of the invention. Unit 10, which is illustrated mounted on the front wall or nose 12 of a highway trailer 14 includes an outer enclosure or housing 16, shown in section, with housing 16 having a plurality of side grille openings 18 located on both the right and left-hand sides of the unit, and a large top opening 20.

Unit 10 includes a frame 22 which supports a prime mover assembly 24, with the prime mover assembly 24 including an internal combustion engine 26, such as a Diesel engine, which has first and second longitudinal ends 27 and 29, respectively. An electric stand-by motor 28 may also be provided as part of the prime mover assembly 24, if desired. The prime mover assembly 24 drives a refrigerant compressor 30 which provides refrigerant for a closed refrigerant circuit which includes a condenser coil assembly 32 and an evaporator coil assembly 34.

An air delivery assembly 36 includes a single shaft 38 upon which are mounted, in axially spaced relation, first, second and third backward inclined blowers 40, 42 and 44, respectively, which have axial air inlets and peripheral outlets. The first and third blowers 40 and 44 are single width condenser blowers which are mounted near the ends of shaft 38, and the second blower 42 is a double width evaporator blower which is mounted between the condenser blowers.

The condenser blowers 40 and 44 draw outside air 45 into unit housing 16 through the side grille openings 18. The outside air 45 is pressurized in the housings of blowers 40 and 44 and the air is directed upwardly through the condenser coil assembly 32. The heated air 47 is discharged through the top opening 20. A radiator coil 46 for engine 26 may also be located such that outside air discharged from blowers 40 and 44 cools engine coolant flowing from engine 26 through the radiator coil 46. Each of the condenser blowers 40 and 44 provides one-half of the air for the condenser coil assembly 32 and the radiator coil 46, with condenser plenums 48 and 50 respectively disposed adjacent to blowers 40 and 44 joining one another above the air delivery assembly 36 to provide a single large plenum chamber below the condenser coil assembly 32 and radiator coil 46.

The double inlet evaporator blower 42 draws air 51 from a conditioned load space 52 defined by trailer 14, via a shallow inlet bulkhead 54 in the trailer front wall 12. Return air 51 is drawn through the evaporator coil assembly 34, into an evaporator inlet chamber 55 and the resulting conditioned air 56 is discharged back into the conditioned space 52 via an upper opening 58 in the evaporator section of unit 10. The evaporator inlet air chamber 55 is separated from the condenser plenums 48 and 50 via first and second bulkheads 60 and 62, respectively.

Shaft 38 is supported near its ends by first and second bearing assemblies 64 and 66, respectively. The first bearing assembly 64 is preferably supported by the first bulkhead 60, immediately adjacent to the in-board side of the first blower 40. The second bearing assembly is supported by a structural element 68 on the out-board side of the third blower 44. A shaft air seal 70 seals shaft 38 against air leakage between the condenser and evaporator plenums as it proceeds through the second bulkhead 62.

Shaft 38 is driven by a drive arrangement 72 which includes a pulley 74, a jack shaft assembly 76, and the prime mover assembly 24. Pulley 74 is fixed to shaft 38, near the axial end thereof which is supported by the second bearing assembly 66.

Jack shaft assembly 76 includes a jack shaft 77 journalled for rotation via bearing assemblies 78 and 80, with the jack shaft assembly 76 being supported by a suitable structural elements which permit assembly 76 to move fore and aft and rotate, as required to adjust belt tension of drive belts. Jack shaft assembly 76 includes at least first and second pulleys 84 and 86 fixed thereto. In a preferred embodiment, a third pulley 88 is also fixed to jack shaft 77 for driving an alternator 90, via a pulley 92 on the alternator 90 and a belt 94 which links pulleys 88 and 92.

When the prime mover assembly 24 includes only engine 26, the air delivery drive arrangement 72 includes a crankshaft pulley 96 on engine 26 which is linked with the first pulley 84 on jack shaft 76 via a belt 98. The jack shaft 76 in turn drives the air delivery shaft 38 via a belt 99 which links jack shaft pulley 86 and air delivery shaft pulley 74.

When the prime mover assembly 24 includes engine 26 and a stand-by electric motor 28, the air delivery drive arrangement 72 includes a pulley 100 on a motor shaft 102, with motor pulley 100 being directly linked to jack shaft pulley 84 via a belt 104. Engine 26 includes a centrifugal clutch 106 which is linked to a pulley 108 on motor shaft 102 via a belt 110.

When engine 26 is operative the electric motor 28 is de-energized, but the motor shaft 102 is used as a second jack shaft, driving air delivery shaft 38 via engine 26, clutch 106, motor pulley 108, the belt 110 which links clutch 106 and motor pulley 108, motor shaft 102, motor pulley 100, and the belt 104 which links motor pulley 100 and jack shaft pulley 84. When engine 26 is not operative and the stand-by electric motor 28 is energized to drive compressor 30, clutch 106 de-couples engine 26 from the compressor 30, and motor 28 directly drives jack shaft 76, and thus the air delivery shaft 38.

The in-line, three-blower, single-shaft air delivery arrangement 36 and the air delivery drive arrangement 72 which includes jack shaft 72, co-operatively enable transport refrigeration unit 10 to have a very narrow depth dimension 114, as shown in FIG. 2, measured from the front of housing 16 to the back of the evaporator section. The dimension 114 achievable by unit 10 with the hereinbefore described construction is within the 21 inch (533 mm.) maximum depth requirement of the EEC. While the area occupied by unit 10 has been reduced by 39%, compared with the transport refrigeration unit disclosed in the hereinbefore mentioned U.S. Pat. No. 4,551,986, the unit performance has only been reduced by 8%, compared with the unit of the aforesaid patent.

The in-line three-blower arrangement of air delivery assembly 36 also reduces external noise produced by unit 10, as there are no axial flow propeller fans, such as shown in U.S. Pat. No. 4,736,597, which patent is assigned to the same assignee as the present application. Axial flow propeller fans are conventionally located close to the air grilles in the housing, transmitting their noise through the grille openings to the surrounding area. The backward inclined blowers 40, 42, and 44 are located away from the grille openings 18 via air inlet chambers and ducts which muffle noise transmitted outside the housing 16.

Figure 4:
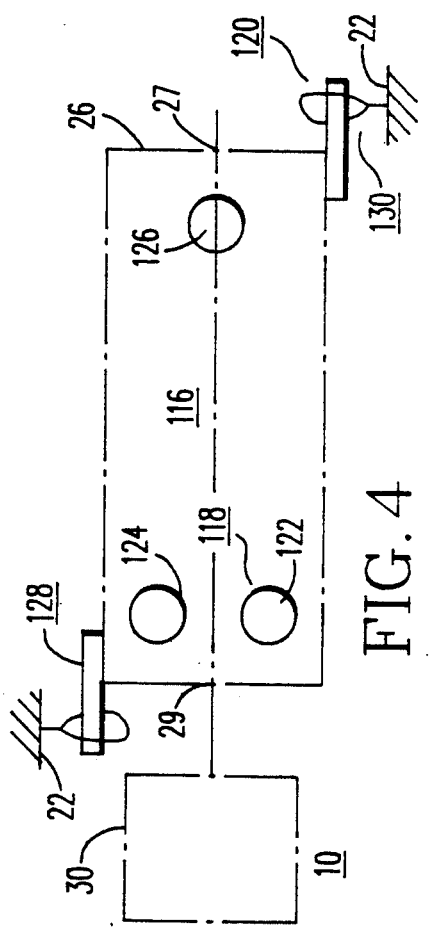
FIG. 4 is a schematic representation, in plan, illustrating a three-point base mounting arrangement, with snubbers, which is used to mount an internal combustion engine which drives a refrigerant compressor.

A preferred embodiment of the present invention further reduces the noise level transmitted outside the unit housing 16 via a resilient engine mounting arrangement 116 which includes base support means 118 and snubber means 120. The base support means 118 includes only first, second and third resilient isolating engine mounts 122, 124, and 126 disposed in a triangular arrangement shown in a diagrammatic plan view of engine 26 in FIG. 4. The first and second motor mounts 122 and 124 are disposed to support the second longitudinal end 29 of engine 26 which is adjacent to compressor 30, and the third motor mount 126 is disposed to support the first longitudinal end 27 which is adjacent to crankshaft pulley 96. Tests have shown that the illustrated triangular, three-point engine mounting arrangement transmits less vibration and thus less noise to frame 22 than a rectangular four-point engine mounting arrangement.

The snubber arrangement 120 includes first and second snubber assemblies 128 and 130 located at or near the longitudinal ends 27 and 29 of engine 26, well above the level of the base support means 118. Each snubber assembly, such as snubber assembly 130 includes a metallic pin 132 disposed within the opening of a closely fitting annular ring member 134. As illustrated, pin 132 may be fixed to the engine, and ring member 134 may be fixed to the frame 22, but they may be reversed.

The snubber assemblies 128 and 130 are essential with the three-point base support arrangement 118, in order to protect the motor mounts 122, 124, and 126 against damage when the trailer 14 encounters rough roads, as well as when the trailer turns sharply. Since engine movement is constrained, the snubber arrangement 120 also permits softer motor mounts 122, 124 and 126 to be used, further reducing engine vibration transmitted to the unit frame 22. The snubber arrangement 120 also permits the engine 26 to be mounted closer to the housing 16, such as a spacing of about 0.5 inch (13 mm.) without danger of the engine 26 bumping the housing 16 when the trailer 14 transmits shock forces to unit 10 during highway operation.

We claim:

1. A transport refrigeration system adapted for mounting on the front wall of a trailer, including a frame supporting a refrigerant compressor, a condenser coil assembly, an evaporator coil assembly, a air delivery assembly, and a prime mover assembly for driving the compressor, characterized by:

the air delivery assembly including first, second and third blowers mounted on a first shaft, with the first and third blowers being condenser blowers arranged to provide air flow through the condenser coil assembly, and with the second blower, which is disposed intermediate the first and third blowers, being an evaporator blower arranged to provide air flow through the evaporator coil assembly, a jack shaft spaced from said first shaft, means operatively linking said first shaft and said jack shaft, and means operatively linking the prime mover arrangement and said jack shaft, said prime mover assembly including an internal combustion engine, an electric motor, and clutch means, said means which operatively links the prime mover assembly and the jack shaft including first and second pulleys on the electric motor and the jack shaft, respectively, and belt means linking the fist and second pulleys, wherein the electric motor directly drives the jack shaft when the motor is energized, and, when the electric motor is de-energized and the engine is operative, the engine directly drives the compressor via the clutch means and the engine drives the jack shaft via the de-energized electric motor.

2. The transport refrigeration system of claim 1 wherein the prime mover means includes an internal combustion engine, and including resilient mounting means disposed to isolate the engine from the frame, said resilient mounting means including base support means and snubber means for limiting the movement of the engine, with said snubber means including a first pair of first and second cooperative elements, with one of said elements being supported by the engine at a point spaced above the location of said base support means, and the other of said elements by the frame.

3. A transport refrigeration system adapted for mounting on the front wall of a trailer, including a frame supporting a refrigerant compressor, a condenser coil assembly, an evaporator coil assembly, an air delivery assembly, and a prime mover assembly for driving the compressor, characterized by:

the air delivery assembly including first, second and third blowers mounted on a first shaft, with the first and third blowers being condenser blowers arranged to provide air flow through the condenser coil assembly, and with the second blower, which is disposed intermediate the first and third blowers, being an evaporator blower arranged to provide air flow through the evaporator coil assembly, a jack shaft spaced form said first shaft, means operatively linking said first shaft and said jack shaft, means operatively linking the prime mover arrangement and said jack shaft, said prime mover means including an internal combustion engine, resilient mounting means disposed to isolate said internal combustion engine from the frame, said resilient mounting means including base support means and snubber means for limiting the movement of the engine, said snubber means including a first pair of first and second cooperative elements, with one of said elements being supported by the engine and the other of said elements by the frame.

said first and second cooperative elements respectively including a pin member and a resilient ring member, with said pin member being disposed within said ring member.

4. A transport refrigeration system adapted for mounting on the front wall of a trailer, including a frame supporting a refrigerant compressor, a condenser coil assembly, an evaporator coil assembly, an air delivery assembly, and a prime mover assembly for driving the compressor, characterized by:

the air delivery assembly including first, second and third blowers mounted on a first shaft, with the first and third blowers being condenser blowers arranged to provide air flow through the condenser coil assembly, and with the second blower, which is disposed intermediate the first and third blowers, being an evaporator blower arranged to provide air flow through the evaporator coil assembly, a jack shaft spaced form said first shaft, means operatively linking said first shaft and said jack shaft, and means operatively linking the prime mover arrangement and said jack shaft, said prime mover means including an internal combustion engine, resilient mounting means disposed to isolate the engine from the frame, said resilient mounting means including base support means and snubber means for limiting the movement of the engine, said snubber means including a first pair of first and second cooperative elements, with one of said elements being supported by the engine and the other of said elements by the frame, said snubber means including first and second pairs of first and second cooperative elements disposed within first and second resilient elements.

5. A transport refrigeration system adapted for mounting on the front wall of the trailer, including a frame supporting a refrigerant compressor, a condenser coil assembly, an evaporator coil assembly, an air delivery assembly, and a prime mover assembly for driving the compressor, characterized by:

the air delivery assembly including first, second and third blowers mounted on a first shaft, with the first and third blowers being condenser blowers arranged to provide air flow through the condenser coil assembly, and with the second blower, which is disposed intermediate the first and third blowers, being an evaporator blower arranged to provide air flow through the evaporator coil assembly, a jack shaft spaced from said first shaft, means operatively linking said first shaft and said jack shaft, and means operatively linking the prime mover arrangement and said jack shaft, said prime mover means including an internal combustion engine, resilient mounting means disposed to isolate the engine from the frame, said resilient mounting means including base support means and snubber means for limiting the movement of the engine, with said snubber means including a first pair of first and second cooperative elements, with one of said elements being supported by the engine and the other of said elements by the frame, said internal combustion engine having first and second longitudinal ends, with the second end being coupled to the compressor, said base support means including only three mounting elements, with one of said mounting elements being disposed adjacent to the first longitudinal end and with the remaining two mounting elements being disposed adjacent to the second longitudinal end, said snubber means including first and second snubber assemblies respectively disposed adjacent to the first and second ends of the engine, in vertically spaced relation above the level of the base support means.

* * * * *